United States Patent [19]

Gupta et al.

[11] Patent Number: 5,306,800
[45] Date of Patent: Apr. 26, 1994

[54] PSEUDO NETWORK CONDENSATION POLYMERS

[75] Inventors: Balaram Gupta, North Plainfield; Larry F. Charbonneau, Mendham; Wilfried Hatke, Summit, all of N.J.

[73] Assignee: Hoechst Celanese Corp., Somerville, N.J.

[21] Appl. No.: 973,472

[22] Filed: Nov. 9, 1992

[51] Int. Cl.$^5$ .............................................. C08G 63/00
[52] U.S. Cl. ................................... 528/190; 528/176; 528/184; 528/193; 528/194
[58] Field of Search .............. 528/176, 184, 190, 193, 528/194

[56] References Cited

U.S. PATENT DOCUMENTS

| | | | |
|---|---|---|---|
| 3,639,517 | 2/1972 | Kitchen et al. | 260/879 |
| 3,985,830 | 10/1976 | Fetters et al. | 260/880 |
| 4,013,624 | 3/1977 | Hoeschele | 260/75 |
| 4,217,440 | 8/1980 | Barkey | 528/274 |
| 4,248,980 | 2/1981 | Bi et al. | 525/271 |
| 4,248,981 | 2/1981 | Milkovich et al. | 525/271 |
| 4,248,982 | 2/1981 | Bi et al. | 525/271 |
| 4,248,983 | 2/1981 | Bi et al. | 525/314 |
| 4,248,984 | 2/1981 | Bi et al. | 525/314 |
| 4,410,683 | 10/1983 | Gale | 528/125 |
| 4,710,547 | 12/1987 | Uryu et al. | 525/437 |
| 4,931,534 | 6/1990 | Pakull et al. | 528/193 |

Primary Examiner—John Kight, III
Assistant Examiner—T. Mosley
Attorney, Agent, or Firm—James L. McGinnis

[57] ABSTRACT

Pseudo network polymer is characterized by a network of linear segments which is composed of recurring units of a multivalent branching moiety, a chain-defining moiety, and a coupling moiety. The polymer may be formed into film, fiber and molded articles which exhibit improved mechanical properties in the transverse direction.

25 Claims, 1 Drawing Sheet

PSEUDO NETWORK CONDENSATION POLYMERS

FIELD OF THE INVENTION

The present invention relates to network condensation polymers and blends thereof which are capable of producing extruded articles exhibiting mechanical properties balanced between the machine and transverse direction.

BACKGROUND OF THE INVENTION

U.S. Pat. No. 4,410,683 to Gale teaches aromatic, melt-processable branched polyesters containing at least three linear polyester chains radiating from a single nucleus wherein the chains comprise hydroxy-acid units derived from 4-hydroxybenzoic acid and 6-hydroxy-2-naphthoic acid. The reference recites that two essential requirements must be met to achieve the desired branching in the polyesters: (i) the main chain monomer contains only functions which are derived from AB-type compounds, i.e., hydroxy acids, rather than diacids and diols which are AA- and BB-type compounds, respectively; and (ii) the nucleus contains only functions which are either all A- or B-type compounds, i.e., such species must be exclusively polyacids or polyors, respectively. Gale further teaches that failure Lo meet either requirement may result in additional and/or randomized branching.

Branched polyesters as taught by Gale are limited by low molecular weight and lack of networking ability. Low molecular weight, branched polyesters tend to exhibit poor mechanical properties in both the machine and transverse directions, i.e., weak over all strength. Due to molecular ordering, liquid crystalline polymers generally exhibit good mechanical properties in the direction of molecular ordering, typically, the machine direction. On the other hand, the inability of known branched polyesters to form high molecular weight structures is believed to contribute to their weak over all strength. While known polyesters characterized by a fully networked structure exhibit relatively good mechanical properties in the machine direction and along the transverse direction, these polymers tend to be thermosetting, i.e., a substantially infusible product when cured by heat or other means which make them undesirable for some thermoplastic applications.

SUMMARY OF THE INVENTION

The present invention is directed to a pseudo network condensation polymer including recurring combinations containing an acyclic, cyclic or aromatic multivalent branching moiety containing radicals independently selected from amino, carboxy, oxy, thio, and mixtures thereof wherein the branching moiety is at least trivalent; one or more divalent aromatic chain-defining moieties containing a carboxy radical and a radical selected from amino and oxy, said chain-defining moiety being capable of self-condensation; and a multivalent hydrocarbyl coupling moiety containing radicals selected from amino, carboxy, and oxy, said coupling moiety being incapable of self-condensation; wherein the concentration of the multivalent branching moiety is from about 0.01 to about 10 mole percent, the concentration of the chain-defining moiety is from about 70 to about 99 mole percent, and the concentration of the coupling moiety is from about 0.01 to about 20 mole percent, based on the total concentration of the polymer, with the proviso that the stoichiometric ratio of the branching moiety to the coupling moiety is deficient or excessive of the stoichiometric equivalent ratio.

The pseudo network condensation polymer of the present invention may be blended with other polymers, as well as formed into films, fibers, and molded articles. Articles prepared from the polymer exhibit balanced mechanical properties, between the machine and transverse direction.

BRIEF DESCRIPTION OF THE DRAWINGS

While the specification concludes with claims particularly pointing out and distinctly claiming the present invention, it is believed that the invention will be better understood from the following description in conjunction with the accompanying drawings in which:

DETAILED DESCRIPTION OF THE INVENTION

The pseudo network condensation polymer of the present invention includes recurring combinations of moieties selected from a multivalent branching moiety, I, one or more chain-defining moieties, II, and a coupling moiety, III. Together these moieties are capable of forming a psuedo network condensation polymer characterized by a uniform integration of networking segments having linear segments radiating therefrom.

The multivalent branching moiety, I, provides a central nucleus of which the polymer is structured. Moiety I is an acyclic, cyclic or aromatic branching radical represented by the general formula:

wherein $R^1$, is typically an alkyl or aryl group, W is a terminated functional group such as CO, O, S, and NH, and, a, the valence, is an integer of at least about 3. Typically, a is an integer from about 3 to about 6.

While many moieties conforming to the above specified structure will become apparent to those skilled in the art, typical multivalent branching moieties of the present invention may be selected from:

(a)

wherein $R^2$ is a monovalent radical typically selected from alkyl and aryl groups, preferably, R is $CH_3$, and the branching moiety is tris(p-oxyphenyl)ethane;

(b)

(c)

(d)

(e)

and

(g)

wherein $R^3$ of (e), (f), and (g) above is selected from NH, CO, O, and S. Moiety, I, is generally present in the polymer in a concentration from about 0.01 to about 10 mole percent, and typically, in a concentration from about 0.1 to about 3 mole percent of the total reaction mixture.

The chain-defining moiety, II, provides the central building block of the pseudo network polymer. Moiety II may be represented by the general formula:

$$-(Y-R^4-CO)-$$

wherein Y is independently selected from the group consisting of NH, and O; $R^4$ is an arylene-containing radical having from about 6 to about 30 carbon atoms selected from and and wherein X is selected from O, S, SO₂, CO, OCOO, NHCO, NHCOO, NH(CO)₂, PO₄, Si(C₆H₄O)₂O₂, C(CF₃)₂, C(CH₃)₂, CH₂, (CH₂)₂, CH=CH, CH(CH₃)₃, CH(C₂H₅), C(CH₃) (C₆H₅), and N=N, and wherein Y is selected from O, S, CO, NH and N-alkyl. Moiety II is present in the polymer at a concentration from about 70 to about 99 mole percent, and typically, in a concentration from about 80 to about 90 mole percent of the total reaction mixture. Preferably, R⁴ is selected from arylene-containing radicals so that moiety II forms a rigid chain.

Generally, the chain-defining moiety contains one or more units, i.e., from about I to about 8, selected from random combinations of those listed hereinbefore. Typically, chain-defining moieties may be selected from 6-oxy-2-naphthoyl, 4-oxybenzoyl, 4-aminobenzoyl, as well as C₁ to C₄ alkyl and alkoxy, and halogen ring substituted derivatives thereof in an amount from about 10 to 90 mole percent and about 90 to 10 mole percent, respectively. The possible combinations of 6-hydroxy-2-naphthoyl and 4-oxybenzoyl are more fully described in commonly assigned U.S. Pat. No. 4,161,470 to Calundann, incorporated herein by reference in its entirety.

The coupling moiety, III, of the invention is the component which provides the means for linking plural networking segments together to provide the unique networking structure of the composition. Moiety III is represented by the general formula:

R⁵—(Z)$_d$— wherein Z is independently selected from NH, CO and O such that an ester or amide group is formed when reacted with branching moiety, I, and R⁵ is a divalent aromatic-containing radical selected from and wherein X is selected from O, S, SO₂, CO, OCOO, NHCO, NH(CO)₂, PO₄, Si(C₆H₄O)₂)₂, C(CF₃)₂, C(CH₃)₂, CH₂, (CH₂)₂, CH=CH, CH(CH₃) (C₆H₅), and N=N, or R⁵ is a tri- or tetra-valent aromatic-containing radical selected from

(a)

wherein R² is a monovalent radical selected from alkyl and aryl groups preferably, R² is CH₃;

-continued and and d is an integer from about 2 to about 5. Moiety III is generally present in the polymer at a concentration from about 0.01 to about 20 mole percent, and typically in a concentration from about 0.5 to about 10 mole percent of the total reaction mixture. While $R^1$, $R^4$ and $R^5$ of moieties I, II and III are defined hereinbefore, generally $R^1$, $R^4$ and $R^5$ are interchangeable, i.e., $R^1 = R^4 = R^5$ between the different moieties.

As will become apparent to those skilled in the art, the non-coupled, linear segments may be end capped with a variety of chain terminating components. Acidic end groups may be capped with a variety of alcohols, and hydroxyl end groups may be capped with a variety of organic acids. For instance, end capping units such as unsubstituted and substituted phenylester and methylester may be included at the end of the linear segment portion of the polymer. Capping agents may be utilized in a quantity ranging from about 0.01 to about 5 mole percent, based on the total moles of all of the monomer units in the polymer.

To prevent the formation of a complete network polymer and to promote a pseudo network polymer, stoichiometric equivalent amounts of the multivalent branching moiety, I, and coupling moiety, III, must be avoided. Particularly, it has been discovered that a slight deficiency or excess in the stoichiometric ratio of the moiety I to moiety III must be maintained to promote pseudo networking of the polymer. Generally, the stoichiometric ratio of the multivalent branching moiety to the coupling moiety is from about 1:(a/d−0.5) to about 1:(a/d+0.5), avoiding the stoichiometric equivalent ratio of 1:a/d, wherein a and d are defined as the valences of moiety I and moiety III, respectively. As an example of the typical stoichiometric ratio, when the branching moiety I is trifunctional and the coupling moiety is difunctional, i.e., a=3 and d=2, the stoichiometric equivalent ratio, 1:a/d, of 1:1.5 must be avoided to prevent complete networking of the polymer. To avoid this phenomena and to promote a pseudo networking polymer structure, the stoichiometric ratio generally ranges from about 1:1 to about 1:2, strictly avoiding a moiety I to moiety III ratio of 1:1.5. When the multivalent branching moiety is tetrafunctional and the coupling moiety is difunctional, i.e., a=4 and d=2, an acceptable stoichiometric ratio to promote a psuedo networking polymer is a moiety I to moiety III ranging from about 1:1.5 to about 1:2.5, strictly avoiding the ratio of 1:2. Typically, the stoichiometric ratio of the multivalent branching moiety to the coupling moiety may be from about 1: (a/d−0.25) to about 1: (a/d+0.25), avoiding the stoichiometric equivalent ratio of 1:a/d.

In one embodiment of the invention, the pseudo network condensation polymer contains recurring combinations of moieties I, II, and III wherein:

I is

II is wherein m is from about 10 to about 90 and n is from about 90 to about 10, preferably m is 73 and n is 27; and III is wherein moiety I is present in a concentration from about 0.01 to about 10 mole percent, moiety II is present in a concentration from about 70 to about 99 mole percent, and moiety III is present in a concentration from about 0.01 to about 2 0 mole percent with the proviso that the stoichiometric equivalent ratio of moiety I to moiety III is avoided.

Generally, the melt processable polymers of the present invention may be prepared by a variety of ester-forming techniques wherein organic monomer compounds possessing functional groups which upon condensation form the requisite recurring moieties. A vacuum may be applied to facilitate removal of acetic acid or water formed during the final stage of the condensation (e.g., acetic acid or water) and promote polymerization. Commonly assigned U.S. Pat. No. 4,067,852 to Calundann, herein incorporated by reference in its entirety, describes typical melt acidolysis techniques.

Representative catalysts which may be utilized in either the melt acidolysis or slurry procedure may be selected from dialkyl tin oxide (e.g., dibutyl tin oxide), diaryl tin oxide, titanium alkoxides, alkali and alkaline earth metal salts of carboxylic acids (e.g., sodium acetate and potassium acetate), the gaseous acid catalysts such as Lewis acids (e.g., $BF_3$), hydrogen halides (e.g., HCl), etc. The quantity of the catalyst utilized in the reaction mixture is generally about 0.001 to about 1 weight percent, based upon the total weight of the mixture.

The morphology of the polymeric composition may be determined by examination of the specimen under a Leitz polarizing microscope at a magnification of about 400 to about 750× at a temperature of about 250° to about 350° C. Under magnification, the changes in morphology of one sample was observed as a function of temperature which exhibited a two phase morphology consisting of fine liquid crystalline domains and coarse schlieren-type liquid crystalline texture. The size of the fine liquid crystalline domain depends on the concentration of the multivalent branching moiety I present in the polymer.

Polymer melting behavior, both melting point ($T_m$, temperature of solid to nematic transition) and crystallization point ($T_c$, temperature of nematic to solid transition), as determined by differential scanning calorimetry (DSC) typically range from about 200° to about 360° C.

The polymer commonly exhibits a weight average molecular weight ($M_w$) ranging from about 2,000 to about 100,000, and typically from about 5,000 to about 50,000. The polymer commonly exhibits a number average molecular weight ($M_n$) ranging from about 1,000 to about 50,000, and typically from about 2500 to about 25,000. The molecular weights are determined by gel permeation chromatography (GPC).

The polymer commonly exhibits an inherent viscosity (IV) of at least about 3 dl/g, and typically from about 4 to about 10.0 dl/g when measured in a concentration of 0.1 wt % in a 1:1 v/v of HFIP-PFP at 25° C. The polymers exhibiting an Iv of less than 4dl/g are generally considered as oligomers which can be used in certain applications such as coating or employed as such in in situ polymerization as preformed polymer as described in detail hereinafter.

The polymer commonly exhibits a melt viscosity (Mv) in the range of about 1,500 to about 5,000 poise at about 300° C., at shear rate of $10^2$ $sec^{-1}$, and in the range of about 400 to about 1,500 poise at about 300° C. at shear rate of $10^3$ $sec^{-1}$ as measured in a capillary rheometer using an orifice of 0.015 inches diameter and 1.0 inch length.

While a thermotropic liquid crystalline polymer may be prepared according to the process described hereinbefore, the polymer may conveniently be prepared into lyotropic solutions to facilitate the preparation of films and fibers. Lyotropic solutions of the pseudo network polymer may be prepared by dissolving the polymer in sulfuric acid, dimethylacetamide, methanesulfonic acid, N-methylpyrrolidinone, as well as conventional solvents known in the art.

The pseudo network condensation polymer of the present invention may be prepared by the process of in situ polymerization. Using the in situ process, a preformed thermotropic liquid crystalline polymer is utilized as a reactant for preparing the pseudo network condensation polymer of the invention. The preformed thermotropic liquid crystalline polymer is generally selected from wholly aromatic polyesters, aliphatic-aromatic polyesters, poly (ester-amides), poly (ester-carbonates), and poly (ester-imides). Particularly, the invention is drawn to a process of preparing a pseudo network condensation polymer as a component of a polymer blend via melt acidolysis polymerization wherein a preformed thermotropic liquid crystalline polymer in the melt phase is mixed with the reactants necessary to form a pseudo network condensation polymer in a uniform blend with said preformed thermotropic liquid crystalline polymer via melt acidolysis polymerization. The pseudo network condensation polymers of the present invention may be Utilized as a preformed polymer to prepare other pseudo network condensation polymer.

The pseudo network condensation polymer of the present invention may be blended with other polymers utilizing conventional physical and melt blending techniques, particularly liquid crystalline polymers, to enhance the mechanical properties of the composite polymer blends. The molecular weight of the pseudo network polymers and blends thereof may be further increased by way of solid state polymerization, wherein the particulate polymers or blends thereof are heat treated in an inert atmosphere at a temperature of at least about 240° C. for about 10 to about 20 hours.

The pseudo network condensation polymer may be melt processed in the substantial absence of polymer degradation to form a variety of relatively stiff, shaped articles, e.g., fibers, films, tapes, and molded articles, by a variety of conventional techniques. Fibers and film are commonly prepared by conventional melt extrusion, and molded articles are commonly prepared by conventional injection molding. Articles prepared from the pseudo network polymer of the present invention exhibit improved mechanical properties in the transverse direction. In the fiber form, increasing knot strength is one method of determining an improvement in mechanical strength in the transverse direction.

A molding compound may be formed from the polyester of the present invention which incorporates approximately 1 to 60 percent by weight of a solid filler (e.g., talc) and/or reinforcing agent (e.g., glass fibers).

The polyester of the present invention also may be employed as a coating material which is applied as a powder or from a liquid dispersion or from a lyotropic solutions as disclosed herein before.

The following examples are presented as illustrations of the claimed invention. They are provided for purposes of exemplification only as should be appreciated from the foregoing discussion. Unless otherwise indicated tensile strength (TS), elongation (E), and tensile modulus (Tm) of fibers are measured in accordance with ASTM No. D3822-90; weld line strength (WLS), tensile strength (TS) and tensile modulus (TM) of molded articles are measured in accordance with ASTM No. D638; heat deflection temperature (HDT) is measured in accordance with ASTM No. D648; flex strength (FS) and flex modulus (FM) of molded articles are measured in accordance with ASTM No. D790; notched IZOD (NIZOD) impact is measured in accordance with ASTM No. D256; and knot strength (KS) of the fiber is measured in accordance with ASTT4 No. D2256.

EXAMPLE 1

To a 4 liter 3-neck glass reactor immersed in a sand bath and equipped with a Vigreaux column attached to a condenser and receiver, and C-shaped 316 stainless steel mechanical stirrer were charged:

(a) 1410.4 gm (10.22 moles) of 4-hydroxybenzoic acid ("HBA");
(b) 710.6 gm (3.78 moles) of 6-hydroxy-2-naphthoic acid ("HNA");
(c) 4.3 gm (0.014 moles) of 1,1,1-tris(4-hydroxyphenyl)ethane ("THPE");
(d) 4. 2 gm (0. 02 5 moles) of terephthalic acid ("TA"); and
(e) 0.256 gm (120 ppm) of potassium acetate ("KOAc") under a constant purge of nitrogen at 30 to 40 cc/min.

The reactor was evacuated to approximately 1 to 2 mbar followed by breaking the vacuum with nitrogen. The vacuum-nitrogen purging process was repeated twice, afterwards 1497.1 gm (14.021 moles, 2.5 mol % excess of 98 mol % purity) of acetic anhydride ("$Ac_2O$") was introduced into the reactor through an addition funnel. The reactor was heated in stages using a MicRIcon ® controller as follows:

| Heating Stage No. | Temperature, °C. | Elapsed Time, minutes |
|---|---|---|
| 1 | 25 | 1 |
| 2 | 125 | 60 |
| 3 | 150 | 50 |
| 4 | 200 | 50 |
| 5 | 250 | 50 |
| 6 | 300 | 100 |
| 7 | 330 | 40 |
| 8 | 330 | 15 |
| 9 | 330 | 60 |

The acetic acid began distilling-off when the reactor reached 150° C., and about 99% of theoretical amount of acetic acid (1660 ml) had evolved at the end of heating stage 7. The torque on the stirrer had also risen to such an extent that the stirring rate had to be lowered from 100 to 40 rpm. The nitrogen purge was discontinued and the reactor was evacuated to about 2 mbar. When the torque on the stirrer began to rise again, the reaction was terminated when a Δtorque of 100 mv, based on 40 rpm stirrer speed, was attained. The reactor was cooled and broken to obtain 1618.5 gm (86% yield) of polymer. The polymer was cut and ground into chips for analyses.

The resulting polymer exhibited an IV of 7.4 dl/g when dissolved in a concentration of 0.1 wt % in a 1:1 v/v of HFIP-PFP at 25° C. The molecular weights of the polymer as determined by GPC were as follows:
$M_w$: 36, 060;
$M_n$: 17,980; and
Polydispersity: 2

The polymer exhibited the following properties as determined by DSC at 20° C./min heating rate:

| Melting Point ($T_m$): | 282° C.; |
|---|---|
| Heat of Melting ($H_m$): | 1.3 joules/g; |
| Crystallization Point ($T_c$): | 231° C.; and |
| Heat of Crystallization ($H_c$): | −1.5 joules/g |

The MV at 300° C. was as follows:

| Shear Rate | MV |
|---|---|
| $10^2 sec^{-1}$ | 2366 poise |
| $10^3 sec^{-1}$ | 692 poise |

The polymer melt also exhibited very fine nematic texture as observed by thermo-optical microscopy, and the nematic texture was retained after quenching to ambient temperature.

When molten at 310° to 330° C., the polymer was extruded through a single hole spinneret (0.005 in. dia.×0.007 in.) at a throughput rate of 0.15 gm/min. The as-spun filament was quenched in ambient air (i.e., at 25° C. and 65% RH) prior to windup at a speed of 700 re/min. The as-spun fiber properties were as follows:

| T: | 9 gm/denier; |
|---|---|
| E: | 2.1%; |
| M: | 456 gm/denier; and |
| KS: | 4.7 gm/denier |

The as-spun fiber was heat treated as follows: fiber at ambient temperature was heated to 150° C. in 60 min. held at 150° C. for 60 min. ; heated to 230° C. in 60 min. held at 230° C. for 3 hours; and finally heated to 270° C. for 16 hours. The heat treated fiber exhibited the following properties:

| T: | 14.4 gm/denier; |
|---|---|
| E: | 3.2%; |
| M: | 440 gm/denier; and |
| KS: | 5.7 gm/denier |

The polymer was injection molded neat into ⅛"×4" diameter discs for Dynatup impact (DI) testing in accordance with ASTM No. D3762; the impact strength was 11.3 ft-lbs.

EXAMPLES 2 and 3

Example 1 was substantially repeated with the exception that the reaction was conducted in a 50 gallon stainless steel reactor employing amounts of reactants as follows:

|  | Example 2 | Example 3 |
|---|---|---|
| HBA | 70.52 kg (511 mols) | 70.52 kg (511 mols) |
| HNA | 35.53 kg (189 mols) | 35.53 kg (189 mols) |
| THPE | 214.2 g (0.7 mols) | 2.142 kg (7 mols) |
| TA | 209.2 gm (0.18 mols) | 2.0335 kg (17.5 mols) |
| $Ac_2O^+$ | 73.728 kg (701.05 mols) | 74.722 kg (710.5 mols) |
| KOAc | 12.8 g (120 ppm) | 13.2 g (120 ppm) |
| Yield | 63 kg (67%) | 67 kg (69%) |

+2.5 mol % excess at 99.5% purity

The polymer properties were as follows:

|  | Example 2 | Example 3 |
|---|---|---|
| IV, (dl/g) | 7.6 | 6.2 |
| $T_m$, °C. | 280 | 275 |
| $H_m$, joules/g | 1.6 | 0.9 |
| $T_c$, °C. | 228 | 226 |
| $H_c$, joules/g | −1.2 | −1.2 | the MV at 265° C. was as follows:

| Shear Rate | Example 2 | Example 3 |
|---|---|---|
| $10^2 sec^{-1}$ | 3096 poise | 4613 poise |
| $10^3 sec^{-1}$ | 845 poise | 1400 poise |

The polymer samples were injection molded neat into test bars for analyses utilizing a barrel temperature range from 280° C. to 330° C., and a mold temperature of 100° C. The results were as follows:

|  | Example 2 | Example 3 |
|---|---|---|
| TS, kpsi | 26.4 | 25.0 |
| E, % | 4.0 | 5.0 |
| TM, kkpsi | 1.5 | 1.2 |
| WLS, kspi | 1.5 | 2.2 |
| FS, kpsi | 22.2 | 20.8 |
| FM, kkpsi | 1.2 | 1.1 |
| NIZOD, ft-lb/in | 24.7 | 3.4 |
| HDT, °C. @ 264 psi | 160 | 160 |

Another portion of the polymer samples were mixed together and then compounded with 30% by weight glass fibers and injection molded into test bars as mentioned above. The Dynatup impact was measured in accordance with ASTM No. D3763. The results of the testing are shown below:

|  | Example 2 | Example 3 |
|---|---|---|
| TS, kpsi | 29.2 | 25.1 |
| E, % | 2.5 | 2.2 |
| TM, kkpsi | 2.4 | 2.3 |
| WLS, kspi | 3.1 | 3.5 |
| DI, ft-lbs | 5.5 | 5.1 |

The resulting polymers in each examples were melt spun into single filament fibers as described in Example 1. The single filament fiber properties were as follows:

|  | Example 2 | Example 3 |
|---|---|---|
| T, g/denier | 11.1 | 4.0 |
| E, % | 2.8 | 1.6 |
| M, g/denier | 497.0 | 292.0 |
| KS, g/denier | 4.2 | 2.7 |

The polymer samples were extruded into films of varied thickness on a film extruder at a screw barrel temperature of 290° C. and at a throughout rate of 43 lbs/hr. The films were tested for tensile properties at a strain rate of 0.2 in/min using 2" gauge length, 0.591" width sample. The results in the machine direction were as follows:

| Film thickness, mil | 2 | 5 | 10 |
|---|---|---|---|
| Example 2 | | | |
| TS, kspi | 109.4 | 94.8 | 66.8 |
| E, % | 3.8 | 4.8 | 8.8 |
| M, kkpsi | 4.4 | 3.0 | 1.6 |
| Example 3 | | | |
| TS, kpsi | 32.3 | 46.1 | 55.0 |
| E, % | 1.7 | 3.5 | 7.0 |
| M, kkpsi | 2.4 | 1.8 | 1.4 |

The tensile properties of the film samples measured in the transverse direction using the procedure mentioned hereinbefore were as follows:

| Film Thickness, mil | 2 | 5 | 10 |
|---|---|---|---|
| Example 2 | | | |
| TS, kpsi | 5.0 | 5.8 | 6.9 |
| E, % | 4.2 | 7.5 | 44.9 |
| M, kkpsi | 0.3 | 0.3 | 0.3 |
| Example 3 | | | |
| TS, kpsi | 3.1 | 5.5 | 6.8 |
| E, % | 2.6 | 7.7 | 26.2 |
| M, kkpsi | 0.2 | 0.3 | 0.3 |

EXAMPLES 4–6

The procedure of Example 1 was substantially repeated with the exception that a 5 gallon stainless steel reactor and benzoic acid ("BA"), an end capping agent, were utilized. The amounts of reactants were as follows:

|  | Example 4 | Example 5 | Example 6 |
|---|---|---|---|
| HBA, kg(mol) | 9.57(69.35) | 9.57(69.35) | 9.57(69.35) |
| HNA, kg(mol) | 4.82(25.65) | 4.82(25.65) | 4.82(25.65) |
| THPE, g(mol) | 45.4(0.475) | 290.7(0.95) | 581.4(1.9) |
| TA, g(mol) | 118.3(0.7125) | 236.6(1.425) | 473.1(2.85) |
| BA, g(mol) | 29.0(0.2375) | 58.0(0.475) | 116.0(0.95) |
| Ac$_2$O+, kg(mol) | 10.07(95.7) | 10.14(96.43) | 10.3(97.85) |
| KOAc, g(120 ppm) | 1.8 | 1.8 | 1.9 |
| Yield | 7.3 kg(55%) | 10.9 kg(83%) | 10.9 kg(83%) |

+2.5 mol % excess at 99.5% purity

The polymer properties were as follows:

|  | Example 4 | Example 5 | Example 6 |
|---|---|---|---|
| IV, dl/gm | 6.6 | 5.1 | 4.8 |
| M$_w$ | n.m. | 32,400 | 30,600 |
| M$_n$ | n.m. | 17,000 | 16,500 |
| MWD | n.m. | 1.9 | 1.9 |
| n.m. - not measured | | | |
| T$_m$: | 279° C. | 277° C. | 277° C. |
| H$_m$: | 1.4 joules/g | 0.7 joules/g | 1.6 joules/g |
| T$_c$: | 229° C. | 228° C. | 223° C. |
| H$_c$: | −1.7 joules/g | −1.3 joules/g | −1.5 joules/g |
| MV at 300° C.: | | | |
| 100/sec | 2577 poise | 2054 poise | 3778 poise |
| 1000/sec | 769 poise | 712 poise | 979 poise |

A portion of the polymers from Examples 5 and 6 was injection molded neat into tensile test bars at a barrel temperature range of 290°–300° C. and a mold temperature of 100° C. The results of the testing according to ASTM procedures were as follows:

|  | Example 5 | Example 6 |
|---|---|---|
| TS, kpsi | 24.1 | 18.1 |
| E, % | 4.4 | 4.5 |
| TM, kkpsi | 1.2 | 1.0 |
| WLS, kpsi | 2.5 | 2.7 |

The polymers were also melt spun into single filament fibers as described in Example 1. The as-spun single filament properties were as follows:

|  | Example 4 | Example 5 |
|---|---|---|
| T, gm/denier | 7.1 | 3.5 |
| E, % | 2.0 | 1.0 |
| M, gm/denier | 416.5 | 300.0 |

|  | Example 4 | Example 5 |
|---|---|---|
| KS (gm/denier) | 3.3 | 2.4 |

The polymer samples of these examples were also extruded into films of varied thickness on a film extruder at a screw barrel temperature of 290° C. and a throughput rate of about 10 lbs/hr. The films so formed were tested for their tensile properties using 2 in. gauge length, 0.591 in. sample width specimens at a strain rate of 0.2 in./min. Results of tenacity in the machine direction were as follows:

| Film Thickness (mil) | Example 4 | | Example 5 | | Example 6 | |
|---|---|---|---|---|---|---|
|  | 4 | 8 | 4 | 8 | 4 | 8 |
| TS kpsi | 15.9 | 29.0 | 27.9 | 29.1 | 9.1 | 13.6 |
| E, % | 1.2 | 5.8 | 2.3 | 4.9 | 1.2 | 2.4 |
| M, kkpsi | 1.5 | 0.9 | 1.5 | 0.9 | 0.8 | 0.7 |

The tensile properties of the film samples were also measured in the transverse direction using the same procedure as mentioned above. The results were as follows:

| Film Thickness (mil) | Example 4 | | Example 5 | | Example 6 | |
|---|---|---|---|---|---|---|
|  | 4 | 8 | 4 | 8 | 4 | 8 |
| TS kpsi | 1.8 | 5.3 | 3.0 | 6.6 | 1.5 | 2.7 |
| E, % | 2.4 | 10.8 | 2.3 | 11.4 | 1.5 | 2.2 |
| M, kkpsi | 0.1 | 0.2 | 0.2 | 0.3 | 0.1 | 0.2 |

These polymer samples were also extruded into 40 mil thickness sheets on the same film extruder. The sheets so formed were tested for their tensile and Dynatup impact properties in accordance with the ASTM procedure as mentioned above. The results of these testing in the machine direction (MD) and in the transverse direction (TD) were as follows:

|  | Example 4 | | Example 5 | | Example 6 | |
|---|---|---|---|---|---|---|
|  | MD | TD | MD | TD | MD | TD |
| TS, kpsi | 33.3 | 8.6 | 22.0 | 7.0 | 11.9 | 5.9 |
| E, % | 2.8 | 19.9 | 2.7 | 8.5 | 4.2 | 3.4 |
| M, kkpsi | 2.1 | 0.3 | 1.4 | 0.3 | 0.7 | 0.3 |
| DI, ft-lbs | 1.6 | | 1.4 | | 0.7 | |

EXAMPLES 7 to 9

In these examples trimesic acid (TMA) was used as the branching moiety and 1,4-hydroquinone (HQ) was used as the coupling moiety.

These examples were essentially carried out using the same procedure as in Example I using the following amounts of starting materials:

|  | Example 7 | Example 8 | Example 9 |
|---|---|---|---|
| HBA, g(mol) | 1410.4(10.22) | 1410.4(10.22) | 1410.4(10.22) |
| HNA, g(mol) | 710.6(3.78) | 710.6(3.78) | 710.6(3.78) |
| TMA, g(mol) | 2.9(0.1) | 7.4(0.25) | 14.7(0.5) |
| HQ, g(mol) | 2.0(0.125) | 4.8(0.3125) | 9.6(0.0875) |
| Ac₂O+, g(mol) | 1498.7(14.036) | 1507.9(14.122) | 1513.6(14.175) |
| KOAc, g(120 ppm) | 0.254 | 0.255 | 0.257 |
| Yield | 1653.2 gm(88%) | 1755.6 gm(93%) | 1732.5 gm(92%) |

+2.5 mol % excess of 98% purity

The polymer properties were as follows:

|  | Example 7 | Example 8 | Example 9 |
|---|---|---|---|
| IV dl/gm | 6.65 | 6.88 | 5.88 |
| $T_m$: | 284° C. | 281° C. | 277° C. |
| $H_m$: | 0.7 joules/g | 0.8 joules/g | 1.0 joules/g |
| $T_c$: | 234° C. | 232° C. | 228° C. |
| $H_c$: | −1.5 joules/g | −1.1 joules/g | −1.3 joules/g |
| MV at 300° C.: | | | |
| 100/sec | 3347 poise | 2717 poise | 1581 poise |
| 1000/sec | 1080 poise | 903 poise | 592 poise |

A portion of the polymer samples from these Examples were injection molded neat into Dynatap test specimens as mentioned before. The test specimens were injection molded at a barrel temperature range of 290°–300° C. and a mold temperature of 100° C. The results were as follows:

|  | Example 7 | Example 8 | Example 9 |
|---|---|---|---|
| DI, ft-lbs | 14.1 | 15.8 | 8.3 |

This example illustrates that if balanced stoichiometry is employed the resulting polymer is intractable.

COMPARATIVE EXAMPLE 10

Example 1 was substantially repeated with the exception that stoichiometric equivalent amounts of reactants were employed as follows:

| HBA, g (mol) | 1208.9(8.76) |
|---|---|
| HNA, g (mol) | 609.1(3.24) |
| THPE, g (mol) | 146.9(0.48) |
| TA, g (mol) | 79.7(0.48) |
| BA, g (mol) | 58.6(0.48) |
| Ac₂O+, g (mol) | 1358.2(12.72) |
| KOAc, g (120 ppm) | 0.252 |
| Yield | 1675.3 g(78.7%) |

+2.5 mol % excess at 99.5% purity

In the final stage of polycondensation in the heating stage number 9, the polymer froze up while under vacuum at which time the reaction was terminated. The reactor was cooled and broken to obtain the polymer. The resulting polymer was intractable, i.e., could not be dissolved in HFIP-PFP solvent mixture or could not be melt processed.

Figure 1:
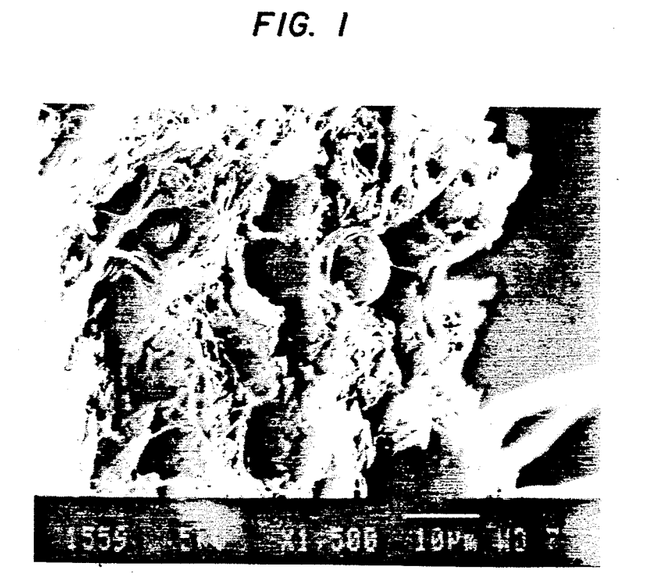
FIG. 1 is a scanning electron micrograph magnified 4,300 times of a pseudo network condensation polymer of the invention containing 1.0% of the multivalent branching moiety.
Figure 2:
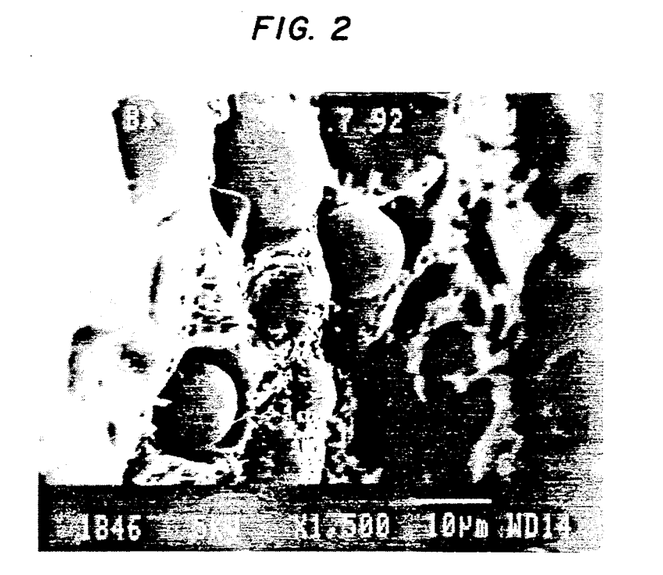
FIG. 2 is a scanning electron micrograph magnified 4300 times of a pseudo network condensation polymer of the invention containing 2.0% of the multivalent branching moiety.

FIGS. 1 and 2 represent scanning electron micrographs of the fractured surfaces of molded articles of compositions of the invention. Particularly, FIG. 1 represents the article formed from the pseudo network polymer of Example 3 (73% HBA, 27% HNA, 1.0% THPE, and 1.75% TA), and FIG. 2 represents the article formed from the polymer of Example 6 (73% HBA, 27% HNA, 2.0% THPE, 3.0% TA, and 0.5% BA). The figures illustrate the presence of a second sphere shaped phase in the polymeric structure due to the formation of the pseudo networks. The variation in size of spheres in the figures is due to the concentration difference of branching moiety, i.e., the composition of FIG. 2 contains twice the concentration of branching moiety of the composition of FIG. 1.

What is claimed:

1. A pseudo network condensation polymer including recurring combinations consisting essentially of an acyclic, cyclic or aromatic multivalent branching moiety containing radicals independently selected from the group consisting of amino, carboxy, oxy, thio, and mixtures thereof wherein the branching moiety is at least trivalent; one or more divalent aromatic chain-defining moieties containing a carboxy radical and a radical selected from the group consisting of amino and oxy, said chain-defining moiety being capable of self-condensation; and a multivalent hydrocarbyl coupling moiety containing radicals selected from the group consisting of amino, carboxy, and oxy said coupling moiety being incapable of self-condensation; wherein the concentration of the branching moiety is from about 0.01 to about 10 mole percent, the concentration of the chain-defining moieties is from about 70 to about 99 mole percent, and the concentration of the coupling moiety is from about 0.01 to about 20 mole percent, with the proviso that the stoichiometric ratio of the branching moiety to the coupling moiety is deficient or excessive of the stoichiometric equivalent ratio.

2. The polymer according to claim 1 wherein the branching moiety is of the formula:

wherein $R^1$ is an alkyl or aryl group, W is a terminated functional group independently selected from the group consisting of NH, CO, O, and $C_6H_4O$, and a is an integer from about 3 to about 6.

3. The polymer according to claim 2 wherein the chain-defining moiety is of the formula:

wherein Y is selected from the group consisting of NH, and O, and $R^4$ is selected from the group consisting of:

and wherein X is selected from the group consisting of O, S, $SO_2$, CO, OCOO, NHCO, NHCOO, $NH(CO)_2$, $PO_4$, $Si(C_6H_4O)_2O_2$, $C(CF_3)_2$, $C(CH_3)_2$, $CH_2$, $(CH_2)_2$, $CH(CH_3)_3$, $CH(C_2H_5)$, $C(CH_3(C_6H_5)$, and N=N, and wherein Y is selected from the group consisting of O, S, CO, NH and N-alkyl.

4. The polymer according to claim 3 wherein the coupling moiety is selected from the group consisting of:

wherein Z is selected from the group consisting of NH, CO, and O, $R^5$ is a divalent radical selected from the group consisting of and wherein X is selected from the group consisting of O, S, $SO_2$, CO, OCOO, NHCO, $NH(CO)_2$, $PO_4$, $Si(C_6H_4O)_2)_2$, $C(CF_3)_2$, $C(CH_3)_2$, $CH_2$, $(CH_2)_2$, CH=CH,

CH(CH$_3$)(C$_6$H$_5$), and N=N, or R$^5$ is a tri- or tetravalent radical selected from (a)

wherein R$^2$ is a monovalent radical selected from alkyl and aryl groups;

and and d is an integer from 2 to 4.

5. The polymer according to claim 4 wherein the branching moiety is selected from the group consisting of:

(a)

(b)

(c)

(d)

(e)

(f)

-continued (g)

wherein R³ of (e), (f), and (g) are selected from the group consisting of NH, CO, O, and S.

6. The polymer according to claim 5 wherein the branching moiety is tris(p-oxyphenyl)ethane.

7. The polymer according to claim 6 wherein the chain-defining moiety is of the formula:

wherein the ratio of m to n is in the range of about 10 to 90 to about 90 to 10.

8. The polymer according to claim 7 wherein the coupling moiety is of the formula:

wherein R⁵ is selected from the group consisting of and

9. A pseudo condensation network polymer consisting essentially of moieties, I, II and III, where
I is wherein R¹ is an alkyl or aryl group, W is a terminated functional group independently selected from the group consisting of NH, CO, S, and O, and a is an integer from about 3 to about 6;
II is wherein Y is independently selected from the group consisting of NH, and O, and R⁴ is one or more arylene radicals having from about 6 to about 30 carbon atoms; and
III is wherein Z is selected from the group consisting of NH, CO, and O, R⁵ is a multivalent aromatic-containing radical, and d is an integer from about 2 to about 5; wherein moiety I is present in a concentration of from about 0.01 to about 10 mole percent, moiety II is present in a concentration of from about 70 to about 99 mole percent, and moiety III is present in a concentration of from about 0.01 to about 20 mole percent; and with the proviso that the stoichiometric ratio of moiety I to moiety III is from about 1:(a/d−0.5) to about 1:(a/d+0.5), avoiding the stoichiometric equivalent ratio of 1:a/d.

10. The polymer according to claim 9 selected from the group consisting of thermotropic and lyotropic compositions.

11. A film, fiber or molded article prepared from the polymer according to claim 10 which exhibits improved mechanical properties in the transverse direction.

12. A psuedo network condensation polymer comprising linear and networking segments, the polymer consisting essentially of recurring moieties I, II, and III wherein:
I is wherein R¹ is an alkyl or aryl group, W is a terminated functional group independently selected from the group consisting of NH, CO, S, and O, and a is an integer from about 3 to about 6;
II is wherein Y is independently selected from the group consisting of NH, and O, and R⁴ is an arylene radical having from about 6 to about 30 carbon atoms; and
III is wherein Z is selected from the group consisting of NH, CO, and O, R⁵ is a multivalent aromatic-containing radical, and d is an integer from about 2 to about 5; wherein moiety I is present in a concentration of from about 0.01 to about 10 mole percent, moiety II is present in a concentration of from about 70 to about 99 mole percent, and moiety III is present in a concentration of from about 0.01 to about 20 mole percent; and with the proviso that the stoichiometric ratio of moiety I to moiety III is from about 1:(a/d−0.5) to about 1: (a/d+0.5), avoiding the stoichiometric equivalent ratio of 1:a/d.

13. The polymer according to claim 9, wherein moiety I is

14. The polymer according to claim 9, wherein moiety II is wherein the ratio of m to n is in the range of about 10 to 90 to about 90 to 10.

15. The polymer according to claim 9, wherein moiety III is

16. The polymer according to claim 9 which contains from about 0.01 to about 5 mole percent of an end capping agent.

17. The polymer according to claim 9 prepared by way of melt acidolysis.

18. A film, fiber or molded article prepared from the polymer according to claim 9 which exhibits improved mechanical properties in the transverse direction.

19. A process for preparing a pseudo network polymer as a component of a polymer blend, wherein the polymer includes recurring combinations of moieties consisting essentially of an acyclic, cyclic or aromatic multivalent branching moiety containing radicals independently selected from the group consisting of amino, carboxy, oxy, thio, and mixtures thereof wherein the branching moiety is at least trivalent; one or more divalent aromatic chain-defining moieties containing a carbonyl radical and a radical selected from the group consisting of amino and oxy said chain-defining moiety being capable of self-condensation; and a multivalent hydrocarbyl coupling moiety containing radicals selected from the group consisting of amino, carboxy, and oxy said network-defining moiety being incapable of self-condensation; wherein the concentration of the branching moiety is from about 0.01 to about 10 mole percent, the concentration of the chain-defining moieties is from about 70 to about 99 mole percent, and the concentration of the coupling moiety is from about 0.01 to about 20 mole percent, with the proviso that the stoichiometric ratio of the branching moiety to the coupling moiety is deficient or excessive of the stoichiometric equivalent ratio, the process comprising the steps of mixing a preformed thermotropic liquid crystalline polymer in the melt phase with the reactants necessary to form a pseudo network condensation polymer in a uniform blend with said preformed thermotropic liquid crystalline polymer.

20. The process according to claim 19 wherein the preformed thermotropic liquid crystalline polymer is selected from the group consisting of wholly aromatic polyesters, aliphatic-aromatic polyesters, poly (ester-amides), polylester-carbonates), and poly(ester-imides).

21. The polymer according to claim 10, wherein the ratio of m to n is about 73 to about 27.

22. The polymer according to claim 8, wherein the ratio of the branching moiety to the coupling moiety is in the range of about 1:1 to about 1:2, with a ratio of 1:1.5 being avoided.

23. A pseudo condensation network polymer consisting essentially of moieties I, II and III, where moiety I is moiety II is wherein the ratio of m to n is in the range of about 90:10 to about 10:90; and wherein moiety III is 24. The polymer as recited in claim 23, wherein moiety I is present in a concentration of from about 0.01 to about 10 mole percent, moiety II is present in a concentration of from about 70 to about 99 mole percent, and moiety III is present in a concentration of from about 0.01 to about 20 mole percent.

25. The polymer as recited in claim 24, wherein the ratio of m to n is about 73:27, and wherein the stoichiometric equivalent ratio of moieties I and III is avoided.

* * * * *